July 31, 1928.

R. C. ALLEN 1,678,968

TURBINE CYLINDER SUPPORT

Filed March 1, 1927

R.C.Allen
INVENTOR

BY  A. B. Reavis
ATTORNEY

Patented July 31, 1928.

1,678,968

UNITED STATES PATENT OFFICE.

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA.

TURBINE-CYLINDER SUPPORT.

Application filed March 1, 1927. Serial No. 171,904.

My invention relates to a support for a machine subjected to substantial temperature changes, more particularly to a support for an elastic fluid turbine, and it has for its object to provide a firm and stable support of the character designated which will permit the machine or turbine to slide freely thereon upon expansion.

Another object is to reduce the frictional resistance to sliding by separately supporting the turbine casing and the bearing pedestal.

Another object is to provide an arrangement for supporting the sliding end of the turbine cylinder upon a rigidly bolted soleplate so that the vertical, transverse and longitudinal forces exerted by the cylinder upon expansion can be exerted only on the soleplate.

In a machine subjected to substantial temperature changes, such as a steam turbine, expansion caused by such temperature changes must be taken care of in supporting the machine. It has heretofore been the practice to slidingly mount the bearing pedestal at the high-pressure end of the turbine on a soleplate and to support said end of the turbine upon the bearing pedestal. Expansion of the turbine casing caused the high-pressure end to slide carrying with it the bearing pedestal. This construction is satisfactory for turbines of a size heretofore in use, but with the larger turbines now coming into use, the heavy weight of the turbine casing resting upon the bearing pedestal causes too much friction between the bearing pedestal and the soleplate. The result is that the casing tends to tilt the bearing pedestal, causing in some cases, serious vibration because of the change in natural frequency of the combined structure of turbine and foundation resulting from this tilting.

I overcome the above difficulties by providing a soleplate rigidly secured to the foundation, upon which the bearing pedestal is slidingly mounted, and supporting the turbine casing directly upon the soleplate. Tie rods or other means are provided for maintaining the bearing pedestal in fixed longitudinal relation to the turbine casing. I also provide the soleplate with upstanding projections upon which the turbine cylinder rests, so that the sliding surfaces will be as nearly as possible in the line of the forces causing the sliding.

Referring now to the drawing in which I have illustrated one embodiment of my invention:

Figure 1:
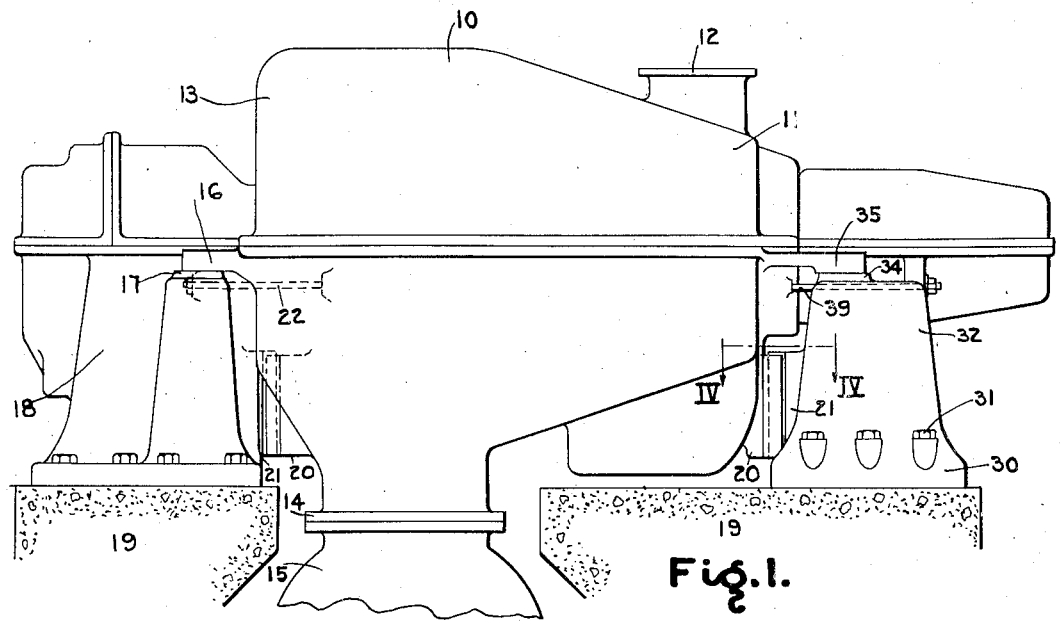
Fig. 1 shows a side elevation of a turbine supported in accordance with my invention.

Referring now to the drawing in detail, I show a turbine 10 having a high-pressure end 11 provided with an admision inlet or opening 12, and a low-pressure end 13 provided with an exhaust connection 14 to which the condenser 15 is attached.

The low-pressure end of the turbine casing is provided with projecting lugs 16 which slidingly rest upon projecting shoulders 17 of the supporting member 18. The supporting member 18 is directly supported on the foundation 19 and may be used, as illustrated, to house the bearing at this end of the turbine.

Figure 4:
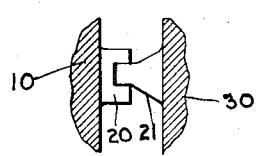
Fig. 4 shows a detail as seen from the line IV—IV of Fig. 1.

The turbine casing is held in transverse alignment at the low-pressure end by vertical key blocks 20 and 21, similar to those illustrated in detail in Fig. 4, and against longitudinal movement by tie rods 22, which are secured to the supporting member 18. The low-pressure end, however, is free to expand laterally by sliding of the lugs 16 on the shoulders 17 and by bending the tie rods 22.

At the high-pressure end of the turbine, I have provided a soleplate 30 which is rigidly secured to the foundation as by bolts 31. The soleplate 30 is provided with upstanding projections 32 disposed on opposite sides of the bearing pedestal 33. The upstanding projections 32 are provided with flat horizontal surfaces 34 upon which are slidingly supported the lugs 35, which are preferably formed integral with the lower half of the turbine casing. The surfaces 34 are formed as near to the horizontal plane of the axis or center line of the turbine as possible. The high-pressure end of the turbine is held in transverse alignment by key blocks 20 and 21, the latter fitting in a groove within the former. The medial plane of the tongue and groove joint comprised by the blocks 20 and 21 is a vertical plane passing through the axis of the turbine. The blocks 20 and 21 are shown in Fig. 4.

Figure 2:
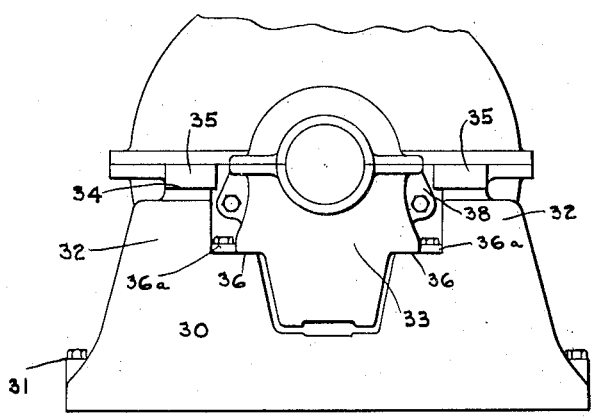
Fig. 2 is an end elevation thereof.
Figure 3:
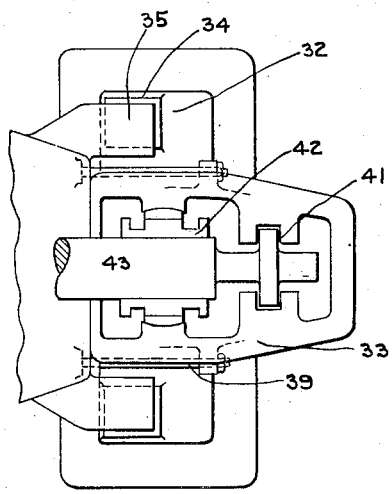
Fig. 3 is a plan view of the high-pressure or sliding end, the cover of the bearing housing being removed.

The bearing pedestal 33 is slidingly supported upon the flat horizontal surfaces 36 (see Fig. 2) formed by shoulders on the inner sides of the upstanding portions 32. These surfaces are preferably disposed as near to the center line of the shaft as practical. The axial center line of the pedestal is maintained in the desired transverse alignment with the cylinder by guide blocks 36ª.

Figure 5:
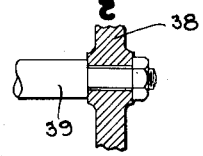
Fig. 5 is a view of a detail.

The bearing pedestal 33 is provided with lateral ears or projections 38 to which are secured the outer ends of tie rods 39. The tie rods 39 are secured at their inner ends to the turbine casing and are provided with shoulders at the ears 38, as shown in Fig. 5, in order to take both tension and compression between the turbine casing and the bearing pedestal. The tie rods are disposed as nearly as practical to the horizontal plane of the axis of the shaft.

Within the bearing housing is disposed the thrust bearing 41. The main bearing 42 may also be disposed therein.

The operation of the above described embodiment of my invention is as follows:

The weight of the cylinder structure of the turbine is transmitted through lugs 16 to the supporting member 18 at the low-pressure end and through lugs 35 to the soleplate 30 at the high-pressure end. The center line is maintained transversely by the key blocks 20 and 21 at each end interlocking directly between the lower half of the turbine casing and the rigid supporting member 18 and the rigid soleplate 30. Upon expansion, however, the casing is free to expand on both sides away from the center line. The casing is held in fixed longitudinal relation at the low-pressure end at the longitudinal position at which the rods 22 are secured. There may be a slight expansion at the low-pressure end beyond this point and such expansion is taken care of by a sliding of the lugs 16 on the shoulders 17. Expansion of the remainder of the cylinder structure, however, must result in a sliding of the high-pressure end, and therefore in a longitudinal force directed to the lugs 35, which will readily slide upon the surfaces 34. As the surfaces 34 are part of the rigid soleplate 30 they may easily be made to successfully resist any tilting caused by the friction of sliding.

As the thrust bearing 41 is contained within the bearing pedestal 33 and as the bearing pedestal is held in fixed longitudinal relation to the turbine casing by the tie rods 39, the sliding of the high-pressure end will slide the bearing pedestal and the thrust bearing along with it. The rotor shaft 43 is, therefore, maintained in predetermined longitudinal relation to the casing, and the axial blade clearances are maintained.

It will be seen from the above description that the forces causing sliding are taken directly by rigid supporting members, which will resist a sliding friction to the maximum degree. The support will therefore be firm and rigid and will avoid any danger of unbalance due to sliding.

While I have shown my invention in one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. Means for supporting a sliding end of an elastic fluid machine comprising a rigid support, a machine casing, a bearing pedestal slidingly mounted on the rigid support, means for slidingly supporting said sliding end of the machine casing upon the rigid support independently of the bearing pedestal, and means for tying the bearing pedestal to the machine casing to slide therewith.

2. Means for supporting a sliding end of an elastic fluid machine comprising a rigid support, a machine casing, a bearing pedestal slidingly mounted on the rigid support, means for directly and slidingly supporting said sliding end of the casing upon the rigid support, and means for tying the bearing pedestal to the machine casing to slide therewith.

3. In a supporting structure for a turbine having a cylinder structure, a rotor disposed therein and a bearing for said rotor, the combination of a stationary and rigid supporting member, means for supporting one end of said cylinder structure directly upon the supporting member, means for supporting the bearing on the supporting member independently of the cylinder structure, guide means permitting longitudinal movement of the cylinder structure and the bearing but preventing lateral movement thereof, and means for retaining the bearing in fixed longitudinal relation to said end of the cylinder structure.

4. In a supporting structure for the sliding end of a turbine having a rotor and a bearing therefor, the combination of a foundation, a soleplate rigidly secured to the foundation, a bearing pedestal in which said bearing is mounted, means for slidingly supporting said pedestal directly upon the soleplate, means for supporting the turbine casing directly upon the soleplate, and means for maintaining the bearing pedestal in fixed longitudinal relation to the casing.

5. In a supporting structure for a fluid machine having a stationary structure and a rotor, the combination of a foundation, a soleplate rigidly secured to said foundation, a bearing pedestal having a bearing therein for the rotor and slidingly mounted upon the soleplate, said soleplate having upstanding projections on opposite sides of the bearing pedestal, means for supporting said stationary structure directly upon said upstanding projections, means for restricting movement of the stationary structure and the bearing pedestal to a path parallel to the longitudinal axis of the rotor, and means for maintaining the bearing pedestal in fixed longitudinal relation to the stationary structure.

6. In a support for a turbine having a cylinder and a rotor shaft, the combination of a soleplate, means arranged in close proximity to the horizontal plane of the longitudinal axis of the turbine and cooperating between the soleplate and the cylinder for supporting the turbine cylinder, a bearing pedestal for the turbine rotor shaft and resting on the soleplate, guides cooperating between the soleplate and the bearing pedestal for restricting movement of said pedestal to a predetermined path, and means securing said pedestal to said cylinder and exerting a holding force substantially in a plane parallel to the longitudinal axis of the turbine.

7. A supporting structure for a machine having a rotor shaft and subjected to temperature changes, comprising means for supporting one end of said machine, means for preventing longitudinal movement of said machine at said end, a stationary supporting member, means for slidingly supporting the other end of said machine directly on said stationary supporting member, a bearing structure for the rotor shaft of said machine, means for slidingly supporting the bearing structure directly upon said stationary supporting member, and means for maintaining the bearing structure in fixed relation to the sliding end of said machine.

8. A supporting structure for the sliding end of a turbine having a cylinder structure, a rotor shaft and a bearing for said shaft, comprising a stationary supporting member, means for slidingly supporting the sliding end of the cylinder structure directly upon said supporting member, means for slidingly supporting the bearing on the supporting member independently of the cylinder structure, and means for maintaining the bearing in fixed relation to the sliding end of the cylinder structure.

In testimony whereof, I have hereunto subscribed my name this tenth day of February, 1927.

ROBERT C. ALLEN.